United States Patent
Kim et al.

(10) Patent No.: US 12,222,425 B2
(45) Date of Patent: Feb. 11, 2025

(54) APPARATUS AND METHOD FOR BLOCKING NAVIGATION SATELLITE SIGNAL RECEPTION WITH RESPECT TO ILLEGAL UNMANNED AERIAL VEHICLES

(71) Applicant: AGENCY FOR DEFENSE DEVELOPMENT, Daegu (KR)

(72) Inventors: Jun O Kim, Daegu (KR); Youngjoong Lee, Daegu (KR)

(73) Assignee: AGENCY FOR DEFENSE DEVELOPMENT, Daegu (KR)

( * ) Notice: Subject to any disclaimer, the term of this patent is extended or adjusted under 35 U.S.C. 154(b) by 0 days.

(21) Appl. No.: 18/718,928

(22) PCT Filed: Dec. 14, 2022

(86) PCT No.: PCT/KR2022/020299
§ 371 (c)(1),
(2) Date: Jun. 12, 2024

(87) PCT Pub. No.: WO2023/140512
PCT Pub. Date: Jul. 27, 2023

(65) Prior Publication Data
US 2024/0418863 A1    Dec. 19, 2024

(30) Foreign Application Priority Data

Jan. 21, 2022    (KR) .......................... 10-2022-0009331

(51) Int. Cl.
*G01S 19/01*    (2010.01)
(52) U.S. Cl.
CPC .................................. *G01S 19/015* (2013.01)

(58) Field of Classification Search
CPC ..... G01S 19/015; H04K 3/90; H04K 2203/22
See application file for complete search history.

(56) References Cited

U.S. PATENT DOCUMENTS

| | | | |
|---|---|---|---|
| 9,523,773 B2 * | 12/2016 | Fink | G01S 19/215 |
| 10,291,348 B2 * | 5/2019 | Tran | G05D 1/0011 |
| 11,358,718 B2 * | 6/2022 | Yoon | B64B 1/50 |

FOREIGN PATENT DOCUMENTS

| | | |
|---|---|---|
| JP | 2021-517398 | 7/2021 |
| KR | 10-2011-0025547 | 3/2011 |

(Continued)

OTHER PUBLICATIONS

KIPO, PCT Search Report & Written Opinion of PCT/KR2022/020299 Mar. 17, 2023.

*Primary Examiner* — Cassi J Galt
(74) *Attorney, Agent, or Firm* — LEX IP MEISTER, PLLC

(57) ABSTRACT

An apparatus for intercepting navigation satellite signal reception to an illegal unmanned aerial vehicle includes a navigation satellite position identification unit configured to identify a position of a navigation satellite, a plurality of radio wave interference sources distributively arranged, and a radio wave interference source selection unit configured to selectively activate, from among the plurality of radio wave interference sources, a radio wave interference source at a position symmetric to the navigation satellite based on a current position or flight trajectory of an illegal unmanned aerial vehicle to cause an interference signal to emit, wherein the interference signal causes the illegal unmanned aerial vehicle to generate symmetric interference in a direction of the navigation satellite.

18 Claims, 8 Drawing Sheets

(56) References Cited

FOREIGN PATENT DOCUMENTS

| | | |
|---|---|---|
| KR | 10-2011-0051091 | 5/2011 |
| KR | 10-2016-0003501 | 1/2016 |
| KR | 10-1668196 | 10/2016 |
| KR | 10-2018-0033612 | 4/2018 |
| KR | 10-2227468 | 3/2021 |
| KR | 10-2236726 | 4/2021 |
| KR | 10-2264751 | 6/2021 |
| KR | 10-2404779 | 6/2022 |

\* cited by examiner

APPARATUS AND METHOD FOR BLOCKING NAVIGATION SATELLITE SIGNAL RECEPTION WITH RESPECT TO ILLEGAL UNMANNED AERIAL VEHICLES

TECHNICAL FIELD

The present invention relates to an apparatus and method for intercepting navigation satellite signal reception to an illegal unmanned aerial vehicle, and more specifically, to an apparatus and method for intercepting navigation satellite signal reception capable of responding to an illegal unmanned aerial vehicle to which a multi-element array antenna-based satellite navigation device is applied.

BACKGROUND ART

Recently, the use of unmanned aerial vehicle technology such as drones has been gradually spreading, leading to the advantage of providing convenience in various fields. However, in some specific areas, illegal drones are frequently observed without special restrictions near major safety facilities that do not allow access of the drones around thereof and are recognized as a threat that can cause unexpected accidents. To date, a simple method is widely known in which countermeasures against the illegal unmanned aerial vehicles as a threat target intercept a GPS receiver signal by using relatively simple interference signals or the like.

However, with the advancement of the satellite navigation device technology applied to unmanned aerial vehicles, it is expected that countermeasures against illegal (threat) unmanned aerial vehicles using a simple radio wave interference device currently in use will soon reach their technical limits, if a multi-element array antenna-based satellite navigation device that can eliminate artificial radio wave interference signals, etc. is applied.

It is known that a general multi-element-based satellite navigation device for processing GNSS (Global Navigation Satellite System) interference signals can cancel or suppress interference signals to a certain level for N−1 radio wave interference source, which is 1 less than the number of N elements, and this is defined as a degree of freedom (DOF) condition. If the number of array antenna elements for an illegal unmanned aerial vehicle increases in line with the miniaturization trend, there is practical difficulty in operating N or more radio wave interference sources to correspond thereto. In addition, since not only the increase in the radio wave interference source but also the additional increase in the RF (Radio Frequency) output or the like of the interference source is also considered, the technical limitations of the general response method of the related art are definite.

DISCLOSURE

Technical Problem

The present disclosure attempts to provide an apparatus and method for intercepting navigation satellite signal reception to an illegal unmanned aerial vehicle, which can selectively intercept a specific navigation satellite signal in order to respond to the illegal unmanned aerial vehicle to which a multi-element array antenna-based satellite navigation device is applied.

Technical Solution

An apparatus for intercepting navigation satellite signal reception to an illegal unmanned aerial vehicle according to an exemplary embodiment of the present invention includes a navigation satellite position identification unit configured to identify a position of a navigation satellite, a plurality of radio wave interference sources distributively arranged, and a radio wave interference source selection unit configured to selectively activate, from among the plurality of radio wave interference sources, a radio wave interference source at a position symmetric to the navigation satellite based on a current position or flight trajectory of an illegal unmanned aerial vehicle to cause an interference signal to emit, wherein the interference signal causes the illegal unmanned aerial vehicle to generate symmetric interference in a direction of the navigation satellite.

The apparatus for intercepting navigation satellite signal reception to an illegal unmanned aerial vehicle may further include an aerial vehicle tracking unit configured to receive current position information including an elevation angle and an azimuth angle of the illegal unmanned aerial vehicle from a radar or optical observation camera, to track the current position of the illegal unmanned aerial vehicle, and to predict the flight trajectory.

The plurality of radio wave interference sources may be distributively arranged around a major facility that does not allow access of the illegal unmanned aerial vehicle around thereof.

The illegal unmanned aerial vehicle may include an antenna platform on which a multi-element array antenna is arranged.

The interference signal may be a real null signal, and the symmetric interference may be a symmetric null signal caused in a process of canceling the interference signal by an interference processing function of a multi-element array antenna system of the illegal unmanned aerial vehicle.

An elevation angle of the interference signal and an elevation angle of the symmetric interference may have the same value and be symmetric with respect to an antenna plane of the antenna platform.

The symmetric interference may result in intercepting reception of a navigation satellite signal present in a zone including a symmetric point area of emission origins of the radio wave interference sources based on an antenna plane of the antenna platform.

The radio wave interference source selection unit may be configured to identify positions of a plurality of navigation satellites from the navigation satellite position identification unit and to selectively exclude the navigation satellite from the illegal unmanned aerial vehicle from among the plurality of navigation satellites.

The radio wave interference source selection unit may be configured to activate n radio wave interference sources to exclude n navigation satellites from which the illegal unmanned aerial vehicle is receiving signals, leading to navigation cessation of the illegal unmanned aerial vehicle.

According to another exemplary embodiment of the present invention, there is provided a method for intercepting navigation satellite signal reception to an illegal unmanned aerial vehicle by using a radio wave interference source selection unit configured to selectively activate a plurality of radio wave interference sources distributively arranged. The method includes selecting, from among the plurality of radio wave interference sources, a radio wave interference source symmetric to a navigation satellite based on a current position or flight trajectory of the illegal unmanned aerial vehicle, and activating the radio wave interference source to cause an interference signal to be emitted in a direction in which symmetric interference is generated in a direction of the navigation satellite.

The method for intercepting navigation satellite signal reception to an illegal unmanned aerial vehicle may further include, by an aerial vehicle tracking unit, receiving current position information including an elevation angle and an azimuth angle of the illegal unmanned aerial vehicle from a radar or optical observation camera, tracking the current position of the illegal unmanned aerial vehicle, and predicting the flight trajectory.

The plurality of radio wave interference sources may be distributively arranged around a major facility that does not allow access of the illegal unmanned aerial vehicle around thereof.

The illegal unmanned aerial vehicle may include an antenna platform on which multi-element array antennas are arrayed.

The interference signal may be an actual null signal, and the symmetric interference may be a symmetric null signal caused in a process of canceling the interference signal by an interference processing function of a multi-element array antenna system of the illegal unmanned aerial vehicle.

An elevation angle of the interference signal and an elevation angle of the symmetric interference may have the same value and be symmetric with respect to an antenna plane of the antenna platform.

The symmetric interference may result in intercepting reception of a navigation satellite signal present in a zone including a symmetric point area of an emission origin of the radio wave interference source based on an antenna plane of the antenna platform.

The radio wave interference source selection unit may be configured to identify positions of a plurality of navigation satellites and to selectively exclude the navigation satellite from the illegal unmanned aerial vehicle from among the plurality of navigation satellites.

The radio wave interference source selection unit may be configured to activate n radio wave interference sources to exclude n navigation satellites from which the illegal unmanned aerial vehicle is receiving signals, thereby causing navigation cessation of the illegal unmanned aerial vehicle.

Advantageous Effects

The apparatus and method for intercepting navigation satellite signal reception to an illegal unmanned aerial vehicle according to an exemplary embodiment of the present invention can achieve the following effects.

First, it is known that a satellite navigation device for canceling GNSS interference signals, to which a multi-element array antenna system is generally applied, can cause inoperability by using N or more radio wave interference sources. However, this method is not efficient in terms of operational concept or cost. The apparatus and method for intercepting navigation satellite signal reception to an illegal unmanned aerial vehicle according to an exemplary embodiment of the present invention can use a radio wave interference source at an optimal position that can cause satellite navigation cessation of an illegal unmanned aerial vehicle, leading to the advantage of inducing a flight abort, RTH (Return To Home), or the like.

Second, it is possible to secure the advantage of minimizing the radio wave interference influence on surrounding areas through an operation of the minimal number of radio wave interference sources that can maximize satellite navigation positions or navigation errors by inducing selective exclusion (signal interception/deterioration) of visible satellites necessary for navigation.

MODE FOR INVENTION

Figure 1:
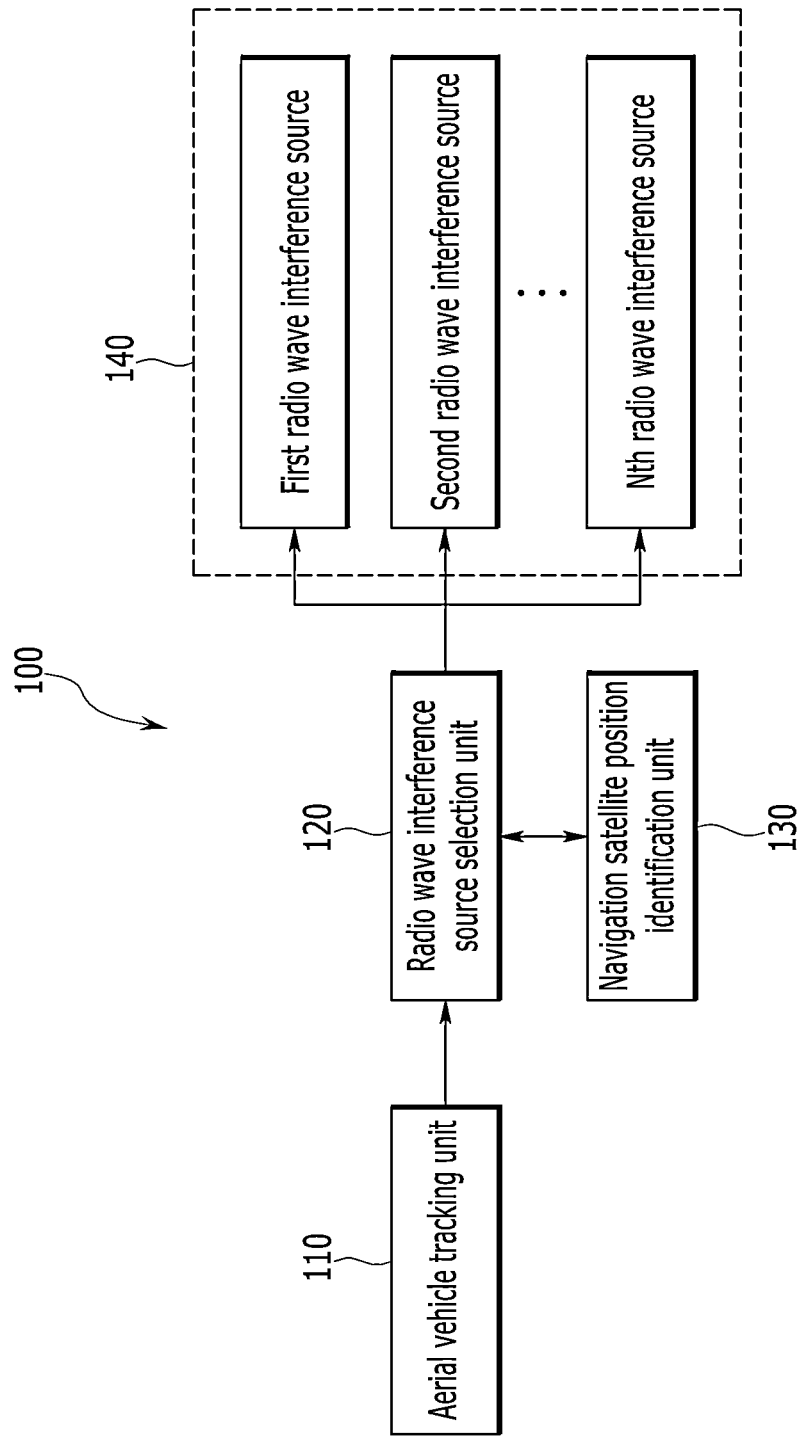
FIG. 1 is a block diagram showing an apparatus for intercepting navigation satellite signal reception to an illegal unmanned aerial vehicle according to an exemplary embodiment of the present invention.

In the following detailed description, only certain exemplary embodiments of the present invention have been shown and described, simply by way of illustration. The present invention can be variously implemented and is not limited to the following exemplary embodiments.

The drawings and description are to be regarded as illustrative in nature and not restrictive. Like reference numerals designate like elements throughout the specification.

In addition, unless explicitly described to the contrary, the word "comprise", and variations such as "comprises" or "comprising", will be understood to imply the inclusion of stated elements but not the exclusion of any other elements.

Hereinafter, an apparatus and method for intercepting navigation satellite signal reception to an illegal unmanned aerial vehicle according to an exemplary embodiment of the present invention will be described with reference to FIGS. 1 to 5.

Figure 2:
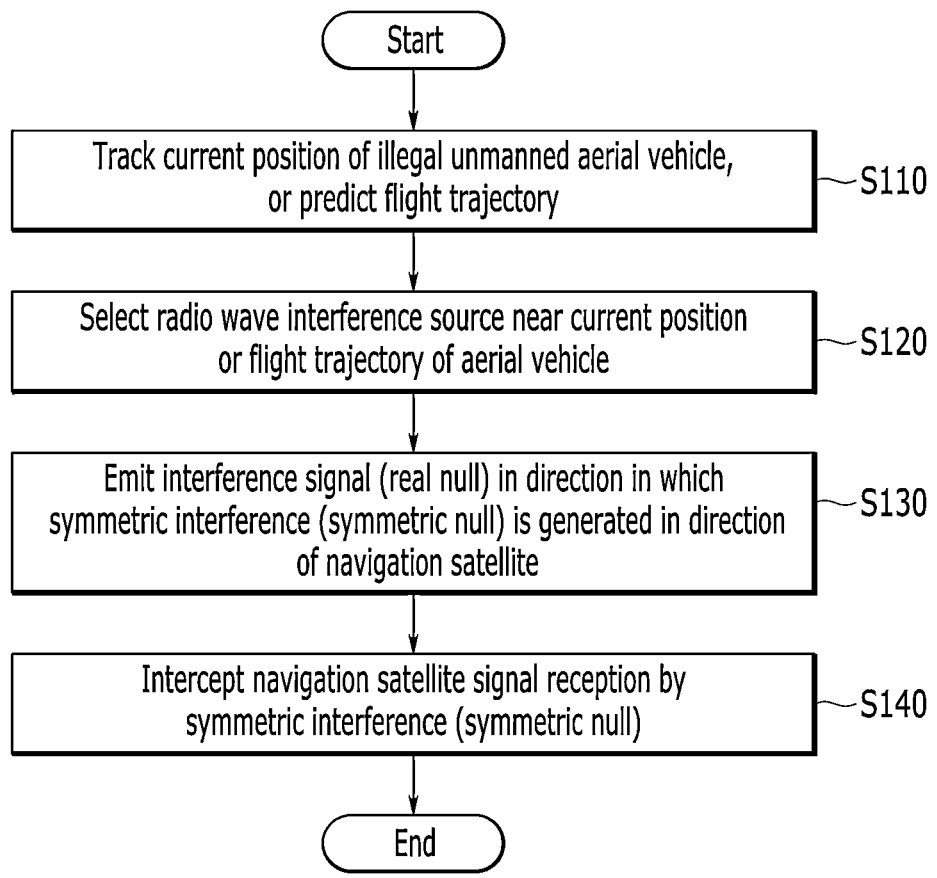
FIG. 2 is a flowchart showing a method for intercepting navigation satellite signal reception to an illegal unmanned aerial vehicle according to an exemplary embodiment of the present invention.
Figure 3:
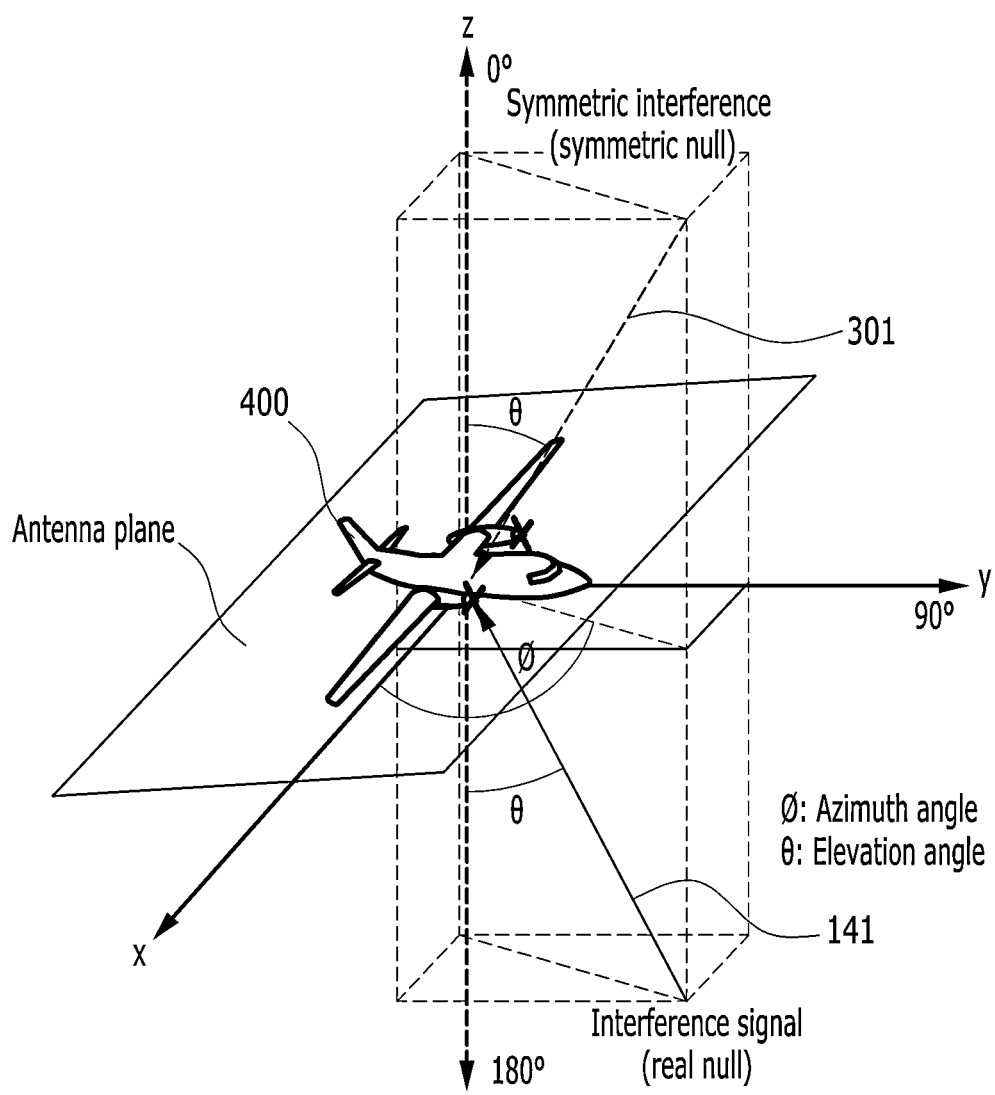
FIG. 3 is an exemplary view for illustrating a principle of generating symmetric interference to an illegal unmanned aerial vehicle according to an exemplary embodiment of the present invention.
Figure 4:
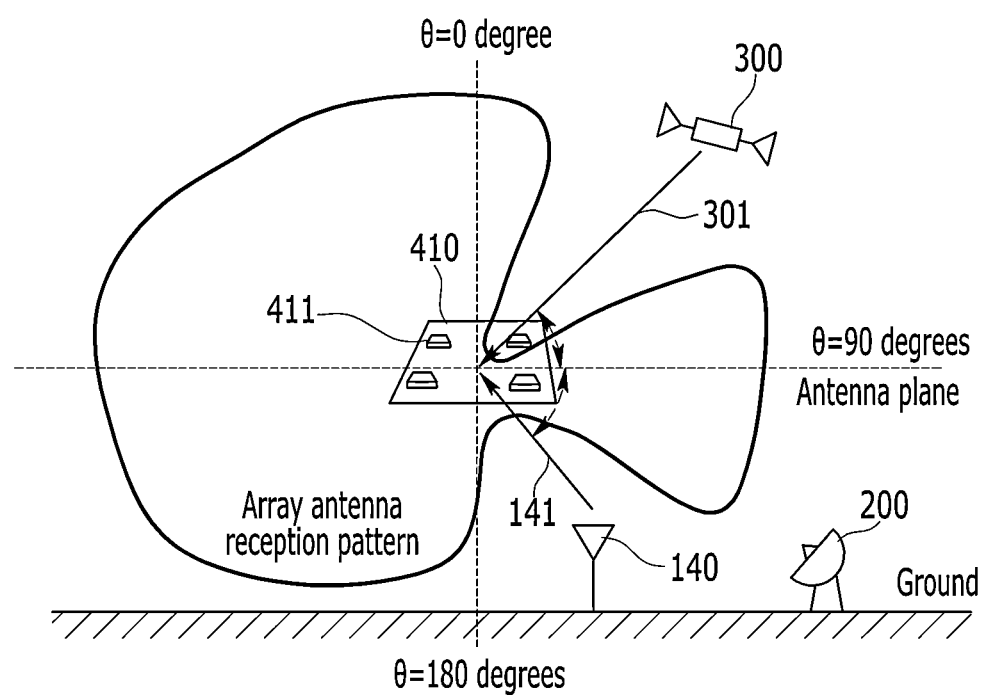
FIG. 4 is an exemplary view showing array antenna reception pattern gain attenuation when a multi-element array antenna-based satellite navigation device according to an exemplary embodiment of the present invention is applied to an illegal unmanned aerial vehicle.
Figure 5:
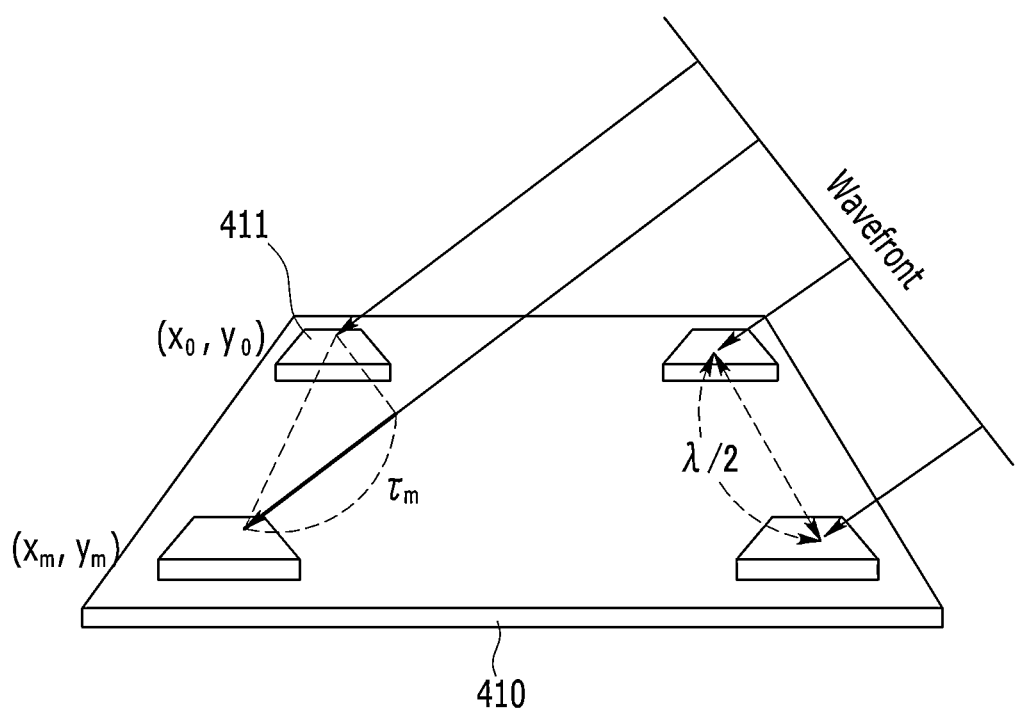
FIG. 5 is an exemplary view for illustrating a definition of an incident angle in consideration of a geometric structure of the multi-element array antenna-based satellite navigation device of FIG. 4.

FIG. 1 is a block diagram showing an apparatus for intercepting navigation satellite signal reception to an illegal unmanned aerial vehicle according to an exemplary embodiment of the present invention. FIG. 2 is a flowchart showing a method for intercepting navigation satellite signal reception to an illegal unmanned aerial vehicle according to an exemplary embodiment of the present invention. FIG. 3 is an exemplary view for illustrating a principle of generating symmetric interference to an illegal unmanned aerial vehicle according to an exemplary embodiment of the present invention. FIG. 4 is an exemplary view showing array antenna reception pattern gain attenuation when a multi-element array antenna-based satellite navigation device according to an exemplary embodiment of the present invention is applied to an illegal unmanned aerial vehicle. FIG. 5 is an exemplary view for illustrating a definition of an incident angle in consideration of a geometric structure of the multi-element array antenna-based satellite navigation device of FIG. 4.

Referring to FIGS. 1 to 5, an apparatus 100 for intercepting navigation satellite signal reception to an illegal unmanned aerial vehicle may include an aerial vehicle tracking unit 110, a radio wave interference source selection unit 120, a navigation satellite position identification unit 130, and a plurality of radio wave interference sources 140.

The aerial vehicle tracking unit 110 may receive current position information on an illegal (threat) unmanned aerial vehicle (see 400 in FIG. 3) from a radar or optical observation camera (see 200 in FIG. 4). The current position information on the illegal unmanned aerial vehicle 400 may include an elevation angle and an azimuth angle of the illegal unmanned aerial vehicle 400. The aerial vehicle tracking unit 110 may track a current position of the illegal unmanned aerial vehicle 400 using the current position information, or may predict a flight trajectory of the illegal unmanned aerial vehicle 400 (S110). In some exemplary embodiments, the radar or optical observation camera 200 may track the illegal unmanned aerial vehicle 400 and transmit the predicted flight trajectory to the aerial vehicle tracking unit 110. The aerial vehicle tracking unit 110 transmits the current position or flight trajectory of the illegal unmanned aerial vehicle 400 to the radio wave interference source selection unit 120.

The plurality of radio wave interference sources 140 are distributively arranged around a major facility that does not allow access of the illegal unmanned aerial vehicle 400 around thereof, and the radio wave interference source selection unit 120 may select, from among the plurality of radio wave interference sources 140, a radio wave interference source 140 near the current position or flight trajectory of the aerial vehicle 400 (S120).

The navigation satellite position identification unit 130 may store almanac data that allows a position of a satellite orbit received from a navigation satellite (see 300 in FIG. 4) of the global navigation satellite system (GNSS) to be determined. The navigation satellite position identification unit 130 can identify a position of the navigation satellite 300 using the almanac data. The navigation satellite position identification unit 130 may generate a sky plot showing positions of navigation satellites.

The radio wave interference source selection unit 120 may identify positions of navigation satellites from the navigation satellite position identification unit 130 when selecting the radio wave interference source 140 near the current position or flight trajectory of the illegal unmanned aerial vehicle 400, and select, from among the plurality of radio wave interference sources 140, a radio wave interference source 140 at a position symmetric to the navigation satellites based on the current position or flight trajectory of the illegal unmanned aerial vehicle 400.

The radio wave interference source selection unit 120 may selectively activate the radio wave interference source 140 symmetric to the navigation satellites and transmit an interference signal emission control signal to the radio wave interference source so that an interference signal (real null) 141 is emitted. The interference signal emission control signal may include a direction in which the selected radio wave interference source 140 should emit the interference signal (real null) 141. The direction in which the interference signal (real null) 141 should be emitted may be a direction in which the illegal unmanned aerial vehicle 400 is caused to generate symmetric interference (symmetric null) 301 in a direction of the navigation satellite.

The selected radio wave interference source 140 may emit an interference signal (real null) 141 in a direction in which symmetric interference (symmetric null) 301 is generated in the direction of the navigation satellite according to the interference signal emission control signal (S130). The interference signal (real null) 141 may be emitted toward the current position or predicted flight trajectory of the illegal unmanned aerial vehicle 400. The interference signal (real null) may cause symmetric interference (symmetric null) 301 to the illegal unmanned aerial vehicle 400. The interference signal 141 may be a real null signal, and the symmetric interference 301 may be a symmetric null signal caused in a process of canceling the interference signal (real null) 141 by an interference processing function of a multi-element array antenna system of the illegal unmanned aerial vehicle 400.

As illustrated in FIGS. 3 and 4, the illegal unmanned aerial vehicle 400 may include an antenna platform 410 on which a multi-element array antenna 411 is arranged, and the interference signal (real null) 141 and the symmetric interference (symmetric null) 301 may be symmetric with respect to an antenna plane of the antenna platform 410. That is, an elevation angle of the interference signal (real null) 141 emitted by the radio wave interference source 140 toward the illegal unmanned aerial vehicle 400 and an elevation angle of the symmetric interference (symmetric null) 301 may be the same value and may be symmetric with respect to the antenna plane, and an azimuth angle of the interference signal (real null) 141 and an azimuth angle of the symmetric interference (symmetric null) 301 may be the same value and may be symmetric with respect to the antenna plane.

The navigation satellite signal reception to the illegal unmanned aerial vehicle 400 may be intercepted (deteriorated) due to the symmetric interference (symmetric null) (S140). That is, the symmetric interference may result in intercepting reception of a navigation satellite signal present in a zone including a symmetric point area of an emission origin of the radio wave interference source 140 based on the antenna plane of the illegal unmanned aerial vehicle 400.

As required, if selective exclusion or signal interception is additionally required, the number of artificial radio wave interference sources 140 placed on the ground may be increased to selectively exclude or completely interrupt, depending on operating conditions, the number of visible satellites of the satellite navigation system from which the illegal unmanned aerial vehicle 400 can receive signals. For example, the radio wave interference source selection unit 120 may activate all n radio wave interference sources (first to nth radio wave interference sources) 140 to exclude (eliminate, or induce reduction in received signal) n navigation satellites 300 from which the illegal unmanned aerial vehicle 400 is receiving signals, leading to navigation cessation of the illegal unmanned aerial vehicle 400.

A principle by which the symmetric interference (symmetric null) is generated will be described with reference to FIGS. 4 and 5. FIGS. 4 and 5 illustrate an antenna platform 410 including a four-element array antenna 411. There is a trend to universally apply the small and low-power four-element array antenna 411 to general small and medium-sized unmanned aerial vehicles such as drones, and for convenience of description, the four-element array antenna 411 is used as an example. However, the number of elements of the array antenna 411 included on the antenna platform 410 of the illegal unmanned aerial vehicle 400 is not limited.

Among the four-element array antenna 411, an inter-element delay time component ($\tau_m$) for an mth element ($x_m$, $y_m$) based on a reference element ($x_0$, $y_0$) can be expressed as Mathematical Formula 1, and a received signal component ($x_m(t)$) of the mth element ($x_m$, $y_m$) can be expressed as Mathematical Formula 2.

$$\tau_m = \frac{d_{m_x}\sin\theta\cos\phi + d_{m_y}\sin\theta\sin\phi}{f_c\lambda} \quad \text{(Mathematical Formula 1)}$$

$$= \frac{d}{f_c\lambda}[(x_0 - x_m)\sin\theta\cos\phi +$$

$$(y_0 - y_m)\sin\theta\sin\phi], \left(d = \frac{\lambda}{2}\right)$$

$$x_m(t) = \quad \text{(Mathematical Formula 2)}$$

$$s(t)\exp\{-j\pi[(x_0 - x_m)\cos\phi + (y_0 - y_m)\sin\phi]\sin\theta\}$$

Mathematical Formulas 1 and 2 define an incident angle in consideration of a geometric structure of the multi-element array antenna 411 mounted on the antenna platform 410 in the multi-element array antenna system, and represent an interference signal propagation delay component $\tau_m$ and a baseband received signal component $x_m(t)$ in a signal processing area, based on the elevation angle $\theta$ and the azimuth angle $\phi$.

In the multi-element array antenna system, regarding a received signal component for the mth element in the array antenna signal processing structure, a signal entering each element is specified by a sine function. That is, Mathematical Formula 2 is organized into the sin $\theta$ term, and 0 to 90 degrees and 90 to 180 degrees are symmetric due to the characteristics of the sin $\theta$ function. Due to this relationship, when the antenna plane of the antenna platform 410 mounted on the illegal unmanned aerial vehicle 400 is $\theta$=90 degrees, the interference signal (real null) at 90 to 180 degrees below the antenna plane and the symmetric interference (symmetric null) at 0 to 90 degrees above the antenna plane are generated symmetrically.

When nulling processing is performed on the interference signal (real null) by the interference processing function of the multi-element array antenna system of the illegal unmanned aerial vehicle 400, the symmetric interference (symmetric null) inevitably occurs according to Mathematical Formula 2, and the illegal unmanned aerial vehicle 400 cannot receive navigation satellite signals due to the symmetric interference (symmetric null) or its SNR is deteriorated, resulting in inoperability.

As described above, the apparatus 100 and method for intercepting navigation satellite signal reception to the illegal unmanned aerial vehicle 400 according to an exemplary embodiment of the present invention can use the radio wave interference source 140 at an optimal position that can cause satellite navigation cessation of the illegal unmanned aerial vehicle 400, leading to the advantage of inducing a flight abort, RTH (Return To Home), or the like using the N or less radio wave interference sources 140.

Figure 6:
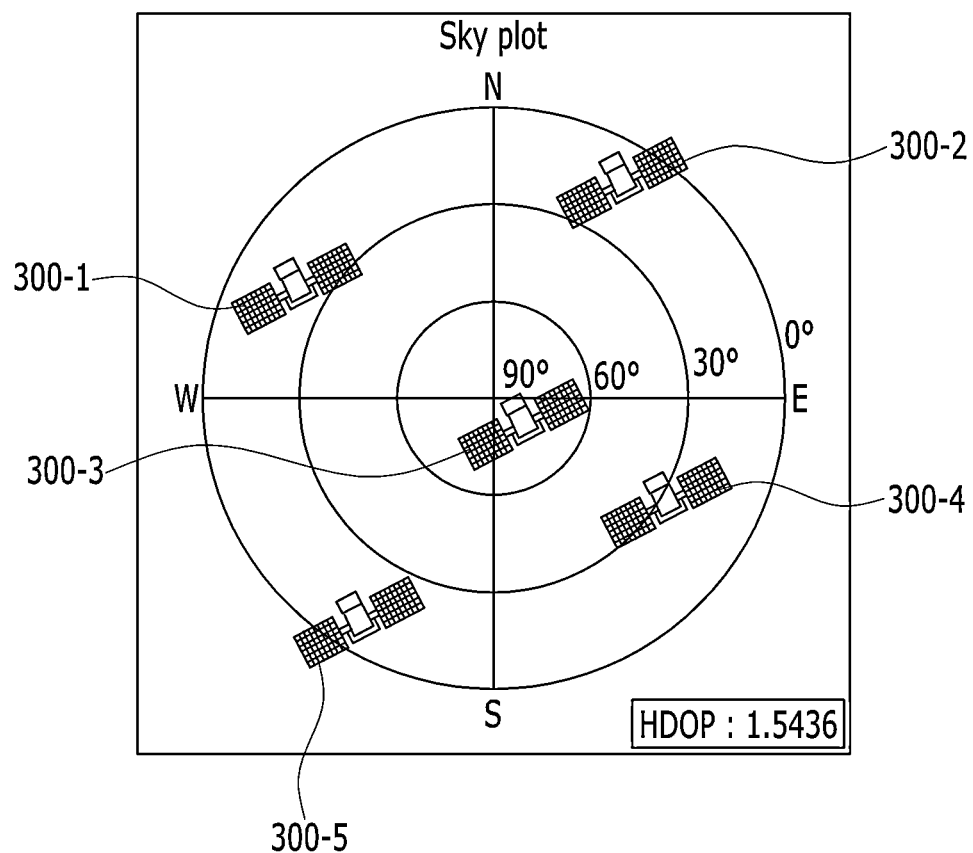
FIGS. 6 to 8 are exemplary views showing a selective exclusion (signal interception/deterioration) method of visible satellites necessary for navigation according to an exemplary embodiment of the present invention.
Figure 7:
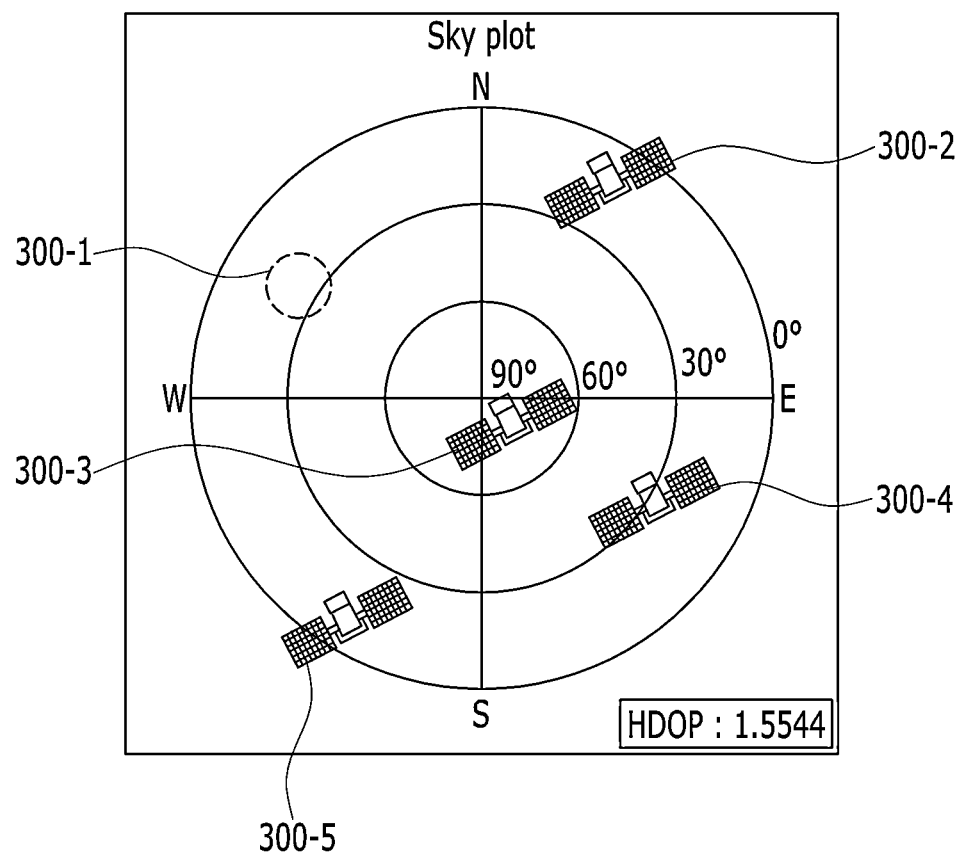
Figure 8:
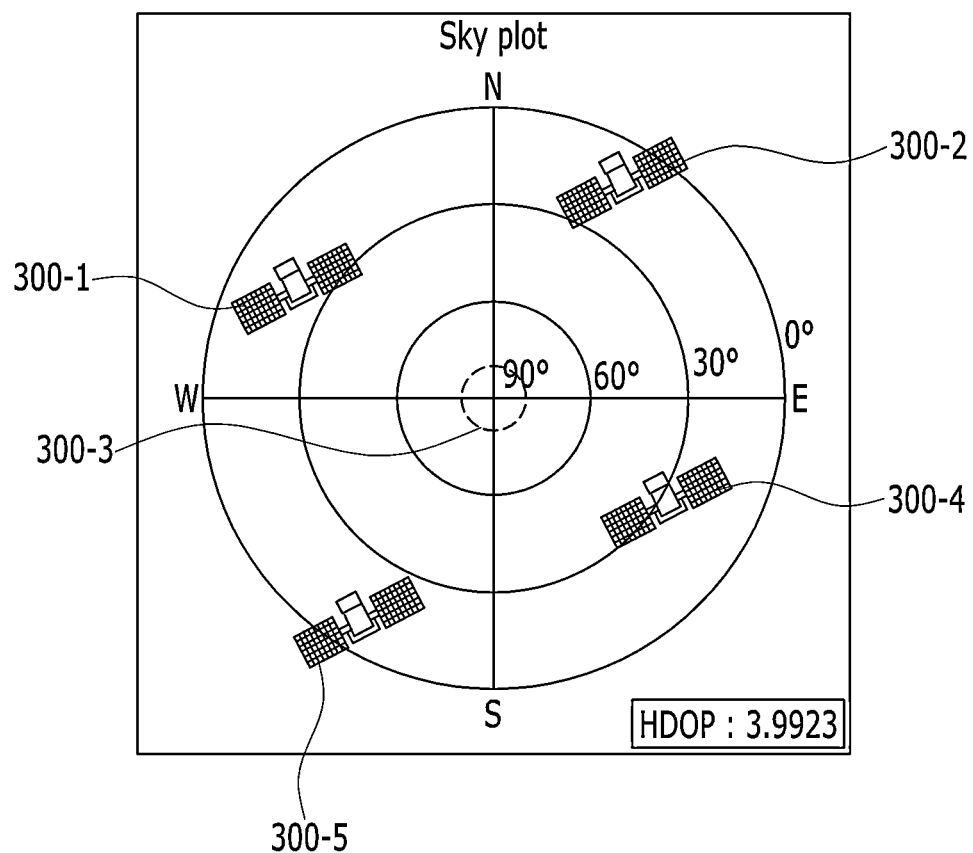

In addition, the apparatus 100 and method for intercepting navigation satellite signal reception to the illegal unmanned aerial vehicle 400 according to an exemplary embodiment of the present invention can identify the positions of navigation satellites by the navigation satellite position identification unit 130, and thus, can selectively exclude (signal interception/deterioration) visible satellites necessary for navigation, as shown in FIGS. 6 to 8.

FIGS. 6 to 8 are exemplary views showing a selective exclusion (signal interception/deterioration) method of visible satellites necessary for navigation according to an exemplary embodiment of the present invention. FIG. 6 shows an example of a skyplot where navigation satellites 300-1, 300-2, 300-3, 300-3, 300-4, and 300-5 are normally located, FIG. 7 shows an example of a skyplot where a northwest navigation satellite 300-1 is excluded, and FIG. 8 shows an example of a skyplot where a zenith-side navigation satellite 300-3 is excluded.

When selecting the radio wave interference source 140 to be activated, the radio wave interference source selection unit 120 of the apparatus 100 for intercepting navigation satellite signal reception identifies positions of the navigation satellites 300-1, 300-2, 300-3, 300-3, 300-4, and 300-5 of FIG. 6 from the navigation satellite position identification unit 130 and selects the radio wave interference source 140 at a position symmetric to the northwest navigation satellite 300-1, thereby selectively excluding the northwest navigation satellite 300-1 from the illegal unmanned aerial vehicle 400, as shown in FIG. 7, or selects the radio wave interference source 140 at a position symmetric to the zenith-side navigation satellite 300-3, thereby selectively excluding the zenith-side navigation satellite 300-3 from the illegal unmanned aerial vehicle 400, as shown in FIG. 8.

A circular error probability (CEP) (horizontal error), which represents a navigation error of the illegal unmanned aerial vehicle 400, can be calculated as CEP[m]=0.83× HDOP×$\sigma_{UERE}$. Here, HDOP is horizontal dilution of precision. Assuming that $\sigma_{UERE}$ is 5 m, the CEP in FIG. 6 is calculated as 7.7 m, the CEP in FIG. 7 is calculated as 7.8 m, and the CEP in FIG. 8 is calculated as 19.9 m. It can be seen that the navigation error of the illegal unmanned aerial vehicle 400 is maximized when the interference signal (real null) and the symmetric interference (symmetric null) are generated using the radio wave interference source 140 at the position symmetric to the zenith-side navigation satellite 300-3. That is, the navigation error of the illegal unmanned aerial vehicle 400 can be maximized by selectively operating the minimal number of radio wave interference sources 140, and the radio wave interference influence on surrounding areas can be minimized by operating the minimal number of radio wave interference sources 140.

Note that, using the characteristic that an antenna null pattern is widened in inverse proportion to the number of elements of the multi-element array antenna, it is also possible to selectively exclude (signal interception/deterioration) navigation satellites located in a specific area by using a single radio wave interference source 140 for a group of navigation satellites clustered at a specific location.

The drawings and the detailed description of the invention referenced so far are merely illustrative of the present invention, are used only for the purpose of describing the present invention, and are not intended to define the meanings thereof or to limit the scope of the present invention set forth in the claims. Therefore, one skilled in the art will understand that various modifications and other equivalent exemplary embodiments are possible from the drawings and the detailed description. Consequently, the true technical protective scope of the present invention should be determined based on the technical spirit of the attached claims.

INDUSTRIAL APPLICABILITY

The apparatus and method for intercepting navigation satellite signal reception to an illegal unmanned aerial vehicle according to an exemplary embodiment of the present invention can be used industrially in the field of technology to prevent threat posed by the illegal unmanned aerial vehicle.

The invention claimed is:

1. An apparatus for intercepting navigation satellite signal reception to an illegal unmanned aerial vehicle, the apparatus comprising:
   a plurality of radio wave interference sources distributively arranged; and
   one or more processors configured to:
      identify a position of a navigation satellite, and
      selectively activate, from among the plurality of radio wave interference sources, a radio wave interference source at a position symmetric to the navigation satellite based on a current position or flight trajectory of an illegal unmanned aerial vehicle to cause an interference signal to emit,
   wherein the interference signal causes the illegal unmanned aerial vehicle to generate symmetric interference in a direction of the navigation satellite.

2. The apparatus of claim 1, wherein the one or more processors are further configured to receive current position information comprising an elevation angle and an azimuth angle of the illegal unmanned aerial vehicle from a radar or optical observation camera, to track the current position of the illegal unmanned aerial vehicle, and to predict the flight trajectory.

3. The apparatus of claim 1, wherein:
   the plurality of radio wave interference sources are distributively arranged around a major facility that does not allow access of the illegal unmanned aerial vehicle around thereof.

4. The apparatus of claim 1, wherein:
   the illegal unmanned aerial vehicle comprises an antenna platform on which a multi-element array antenna is arranged.

5. The apparatus of claim 4, wherein:
   the interference signal is a real null signal, and the symmetric interference is a symmetric null signal caused in a process of canceling the interference signal by an interference processing function of a multi-element array antenna system of the illegal unmanned aerial vehicle.

6. The apparatus of claim 4, wherein:
   an elevation angle of the interference signal and an elevation angle of the symmetric interference have the same value and are symmetric with respect to an antenna plane of the antenna platform.

7. The apparatus of claim 4, wherein:
   the symmetric interference results in intercepting reception of a navigation satellite signal present in a zone comprising a symmetric point area of emission origins of the radio wave interference sources based on an antenna plane of the antenna platform.

8. The apparatus of claim 1, wherein:
   the one or more processors are further configured to:
   identify positions of a plurality of satellites; and
   selectively exclude the navigation satellite from the illegal unmanned aerial vehicle from among the plurality of navigation satellites.

9. The apparatus of claim 1, wherein:
   the one or more processors are further configured to activate n radio wave interference sources to exclude n navigation satellites from which the illegal unmanned aerial vehicle is receiving signals, leading to navigation cessation of the illegal unmanned aerial vehicle.

10. A method for intercepting navigation satellite signal reception to an illegal unmanned aerial vehicle by selectively activating a plurality of radio wave interference sources distributively arranged, the method comprising:
    selecting, from among the plurality of radio wave interference sources, a radio wave interference source symmetric to a navigation satellite based on a current position or flight trajectory of the illegal unmanned aerial vehicle; and
    activating the radio wave interference source to cause an interference signal to be emitted in a direction in which symmetric interference is generated in a direction of the navigation satellite.

11. The method of claim 10, further comprising,
    receiving current position information comprising an elevation angle and an azimuth angle of the illegal unmanned aerial vehicle from a radar or optical observation camera, tracking the current position of the illegal unmanned aerial vehicle, and predicting the flight trajectory.

12. The method of claim 10, wherein:
    the plurality of radio wave interference sources are distributively arranged around a major facility that does not allow access of the illegal unmanned aerial vehicle around thereof.

13. The method of claim 10, wherein:
    the illegal unmanned aerial vehicle comprises an antenna platform on which multi-element array antennas are arrayed.

14. The method of claim 13, wherein:
    the interference signal is an actual null signal, and the symmetric interference is a symmetric null signal caused in a process of canceling the interference signal by an interference processing function of a multi-element array antenna system of the illegal unmanned aerial vehicle.

15. The method of claim 13, wherein:
    an elevation angle of the interference signal and an elevation angle of the symmetric interference have the same value and are symmetric with respect to an antenna plane of the antenna platform.

16. The method of claim 13, wherein:
    the symmetric interference results in intercepting reception of a navigation satellite signal present in a zone including a symmetric point area of an emission origin of the radio wave interference source based on an antenna plane of the antenna platform.

17. The method of claim 10, further comprising:
    identifying positions of a plurality of navigation satellites; and
    selectively excluding the navigation satellite from the illegal unmanned aerial vehicle from among the plurality of navigation satellites.

18. The method of claim 10,
    further comprising activating n radio wave interference sources to exclude n navigation satellites from which the illegal unmanned aerial vehicle is receiving signals, thereby causing navigation cessation of the illegal unmanned aerial vehicle.

* * * * *